July 5, 1949. A. F. ROCK 2,475,153
METHOD OF MAKING A DRY CELL BATTERY UNIT OF FLAT CELLS
Filed Dec. 13, 1945 3 Sheets-Sheet 1

INVENTOR
ARTHUR F. ROCK
BY Fay, Golrick & Chilton
ATTORNEYS

July 5, 1949.    A. F. ROCK    2,475,153
METHOD OF MAKING A DRY CELL BATTERY UNIT OF FLAT CELLS
Filed Dec. 13, 1945    3 Sheets-Sheet 2
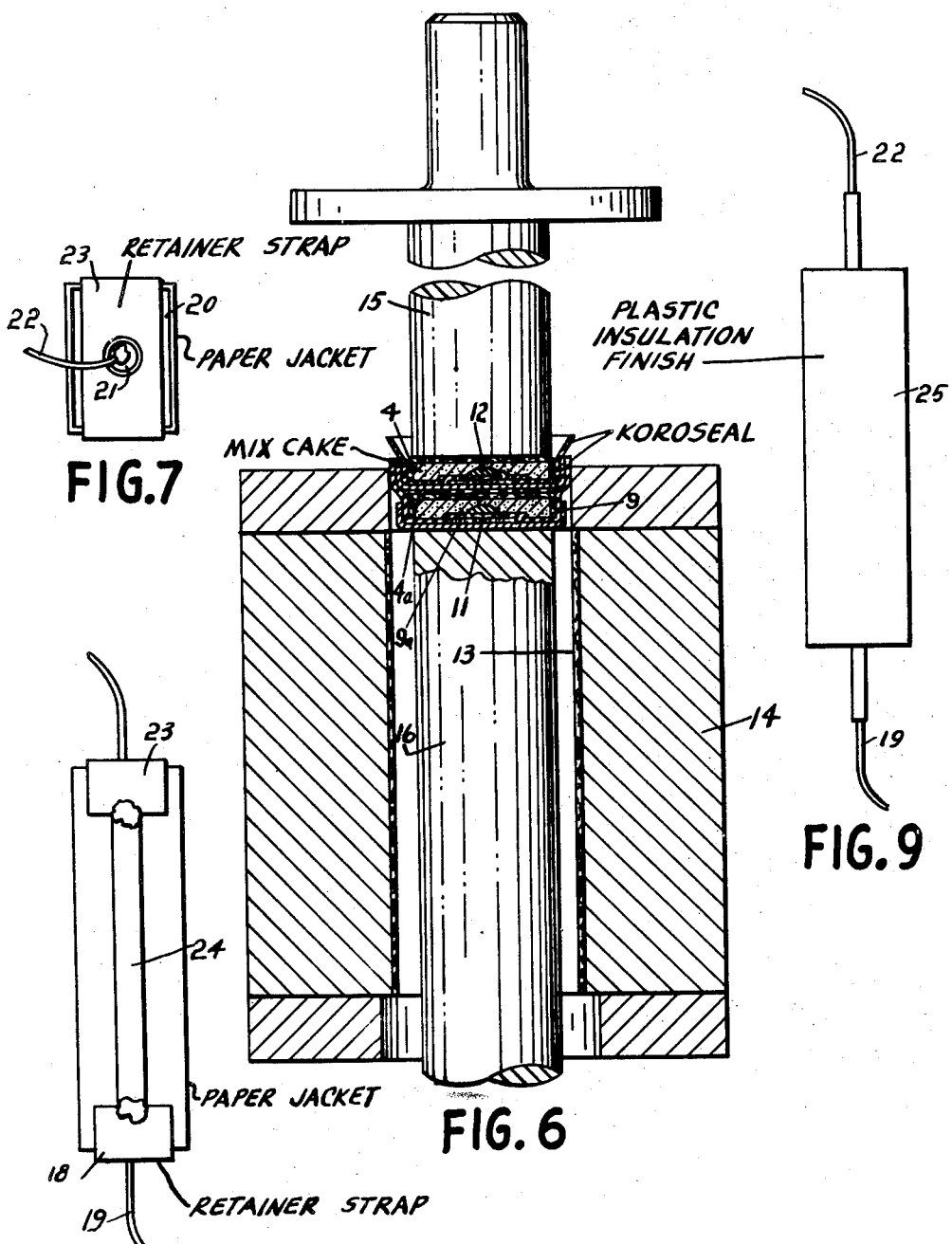
INVENTOR
ARTHUR F. ROCK
BY Fay, Golrick & Chilton
ATTORNEYS July 5, 1949.  A. F. ROCK  2,475,153
METHOD OF MAKING A DRY CELL BATTERY UNIT OF FLAT CELLS
Filed Dec. 13, 1945  3 Sheets-Sheet 3

INVENTOR
ARTHUR F. ROCK
BY
Bosworth & Sessions
ATTORNEYS

Patented July 5, 1949

2,475,153

UNITED STATES PATENT OFFICE 2,475,153

METHOD OF MAKING A DRY CELL BATTERY UNIT OF FLAT CELLS

Arthur F. Rock, Lakewood, Ohio, assignor to General Dry Batteries, Inc., Cleveland, Ohio, a corporation of Ohio Application December 13, 1945, Serial No. 634,652

7 Claims. (Cl. 136—175)

This invention relates to a method of constructing a dry cell battery unit which is made up of a plurality of wafer-like dry cells of any desired shape which are arranged in a casing in stacked relation and connected in series and held in contact under pressure.

The battery unit as an article of manufacture is disclosed in my copending application Serial No. 634,651, filed of even date herewith.

In this improved dry cell battery unit the outside of the bottom of the zinc can is the active zinc surface and not the inside of the can as in all conventional dry cells.

This construction has a number of advantages. Thus, it allows the use of more than one layer of paste-coated battery paper adjacent the active zinc surface, thus providing a more absorbent medium which will retain a greater amount of electrolyte which is essential for maximum service capacity. The battery paper makes uniform contact over the whole area of the active zinc without the application of any great pressure sufficient to squeeze the electrolyte out of the mix. Moreover, during the discharge of the wafer-like cells there is a tendency for the mix to grow or expand as a result of the chemical changes producing the electrical energy. If the inside of the zinc cup is used as the active zinc, it becomes thinner as the energy is withdrawn from the cell and therefore provides less and less physical resistance to growth in the size of the active mix. In this improved construction, however, the outside of the bottom of the zinc cup is the only portion of the cup contacted by battery paper and thus is the active surface and becomes consumed; the sides of the zinc cup remain substantially unaffected and hence offer a support or resistance to the radial growth of the active materials in an exhausted cell. In most cases the exhausted battery will be the same size as the new one and will not tend to become wedged in the equipment or casing in which it is located.

One of the objects of this invention is to provide a method of constructing a dry cell having the above described distinguishing features and characteristics which is well adapted for quantity production at comparatively low cost and which is also adapted for use with automatic or semi-automatic machinery.

Further and more limited objects of the invention will appear as the description proceeds and by reference to the accompanying drawings in which—

Fig. 2 is a similar view showing the second step in the method; while

Fig. 6 is a view partly in section and partly in elevation showing a device for inserting the cells into an outer container; while Figs. 7, 8 and 9 are views in elevation showing the completed battery unit;

The invention, in its preferred form, contemplates the method of constructing a dry cell battery unit which includes the steps of preforming a mix cake which is of any desired shape and then covering the sides and one face of the mix cake with battery paper, positioning a thin layer of sheet plastic insulating material such as vinyl chloride copolymer, rubber hydrochloride or the like over a zinc cup which is of the same shape as the mix cake, and then thrusting or projecting the battery-paper-covered mix cake into the zinc cup so as to cause the layer of plastic insulating material to be folded upwardly along the sides of the battery-paper-covered mix cake and within the zinc cup, there being a carbon electrode in electrical contact with the interior of the bottom wall of the zinc cup, which electrode is embedded in the face of the mix cake opposite the battery-paper-covered face thereof. Then a plurality of such cells are arranged in stacked relation within an outer container, the cells being pressed into intimate contact, with the battery paper covering the face of the mix cake disposed within one zinc cup making contact with the exterior of the bottom of the adjacent zinc cup. The cells are then secured in place under pressure so as to provide a battery unit of the desired capacity. This operation may be carried out by placing the unit or stack of cells in a fixture which applies a predetermined pressure, and then soldering or otherwise securing metal straps around the stack, thus maintaining the individual cells in uniform electrical contact and retaining them against longitudinal expansion in service. The opposite ends of the battery unit have lead wires or terminals secured thereto, and the entire unit or stack may be dipped in or coated with an air-drying lacquer or plasticized plastic insulating material which sets but remains somewhat stretchable, or, if desired, the stack of cells or battery unit may be sealed within a bag or tube of rubber hydrochloride, vinyl chloride copolymer or other suitable material. The essential features of the invention are set forth in the claims.

Figure 1:
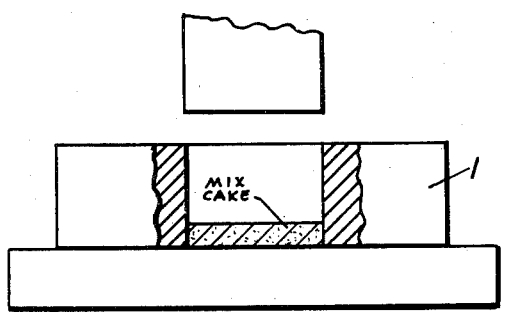
Fig. 1 is a somewhat diagrammatical view showing the first step in the method.
Figure 2:
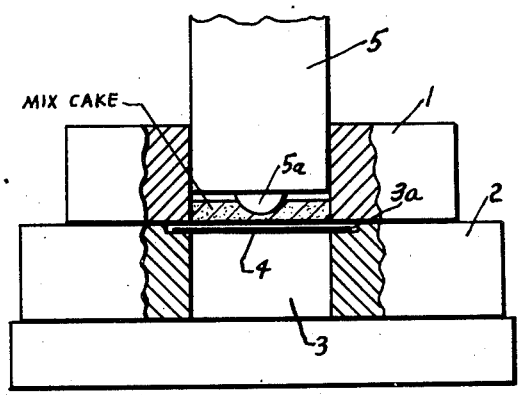
Figure 3:
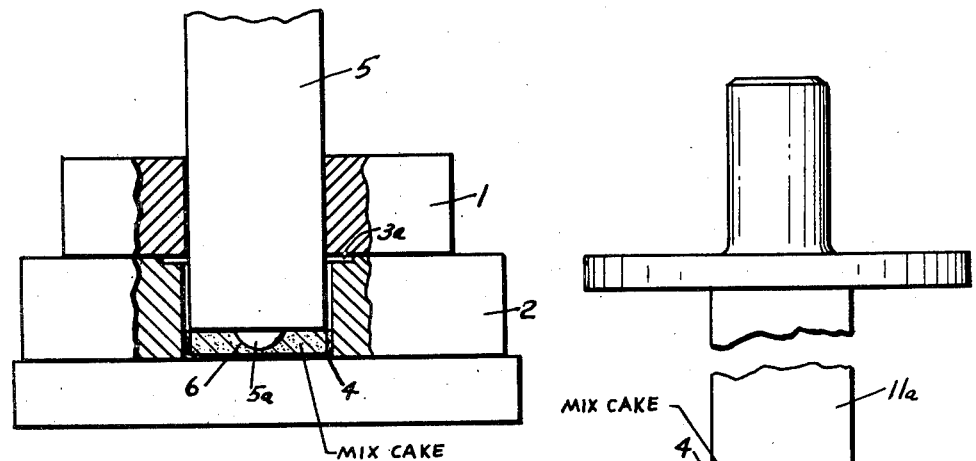
Figs. 3, 4 and 5 are similar views showing the additional steps in the method.

Referring now to the drawings and particularly Figs. 1 to 5 inclusive, Fig. 1 shows somewhat diagrammatically the first step in the method which comprises forming a mix cake within a mold, the mix cake preferably being generally square or rectangular in cross-section. The reference character 1 designates the mold into which the mix is poured. After the mix cake is formed into the desired shape, the mold 1 is placed over a second mold 2 which has a rectangular opening 3 therein and a recess portion 3a which receives therein a paper liner 4. The mix cake is then compressed into the position shown in Fig. 3 by means of a plunger 5, thus causing the paper 4 to be wrapped about the sides and one face of the mass of mix. During this operation, a cavity 6 is formed in the mix cake by the convex shape 5a on the end of the plunger, as shown in Fig. 3.

Figure 4:
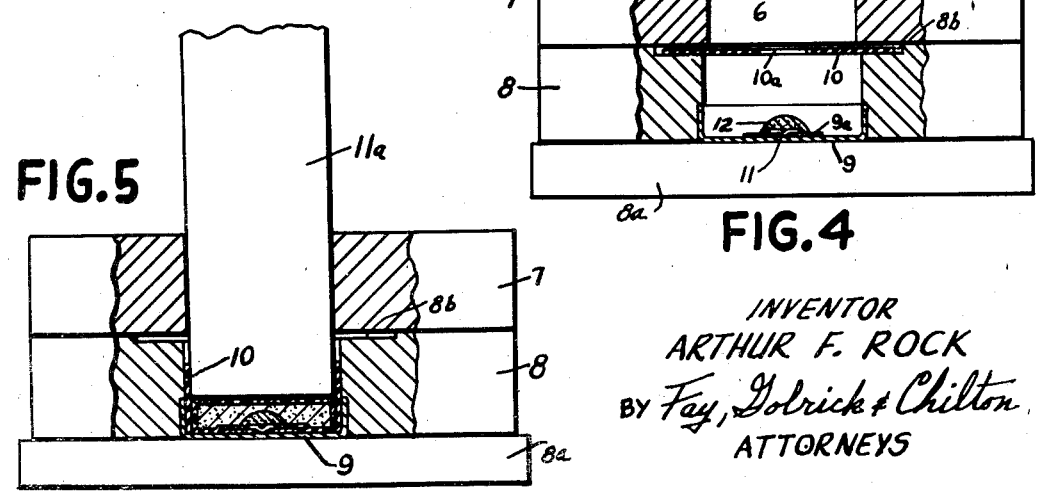
Figure 5:
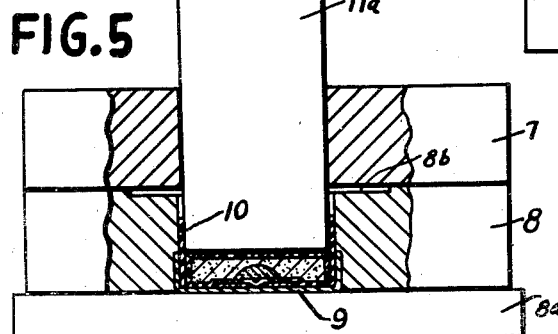

The mix cake is then removed and placed in another mold 7 in the inverted position as shown in Fig. 4. The lower half of the mold indicated by the reference character 8 is supported on a plate 8a and has a central opening therein which receives a zinc cup 9 which has a shape corresponding to the mix cake. The zinc cup may be positioned within the mold 8 by positioning the cup on the plate 8a and then positioning the mold 8 on the plate and over the cup as shown. The zinc cup has a layer of adhesive 9a which holds a metallic contact member 11 and a carbon button 12 securely to the inside face of the zinc cup. The upper face of the mold 8 is provided with a recess 8b which receives therein a thin sheet of plastic insulating material such as rubber hydrochloride, vinyl chloride copolymer or the like, indicated by the reference character 10. It will be noted that the sheet of plastic insulating material has an opening 10a of sufficient size to allow the carbon button to contact the mix cake. When the plunger 11a in Fig. 4 is forced downwardly, the mass of mix and the layer of plastic insulating material are moved or thrust downwardly to the position shown in Fig. 5 and the layer of plastic insulating material is folded upwardly along the paper covered sides of the mix cake and the sides of the plunger. It will be noted that the layer of plastic insulating material is of such size as to extend upwardly beyond the zinc cup a distance substantially equal to the height of the next adjacent zinc cup.

Figure 10:
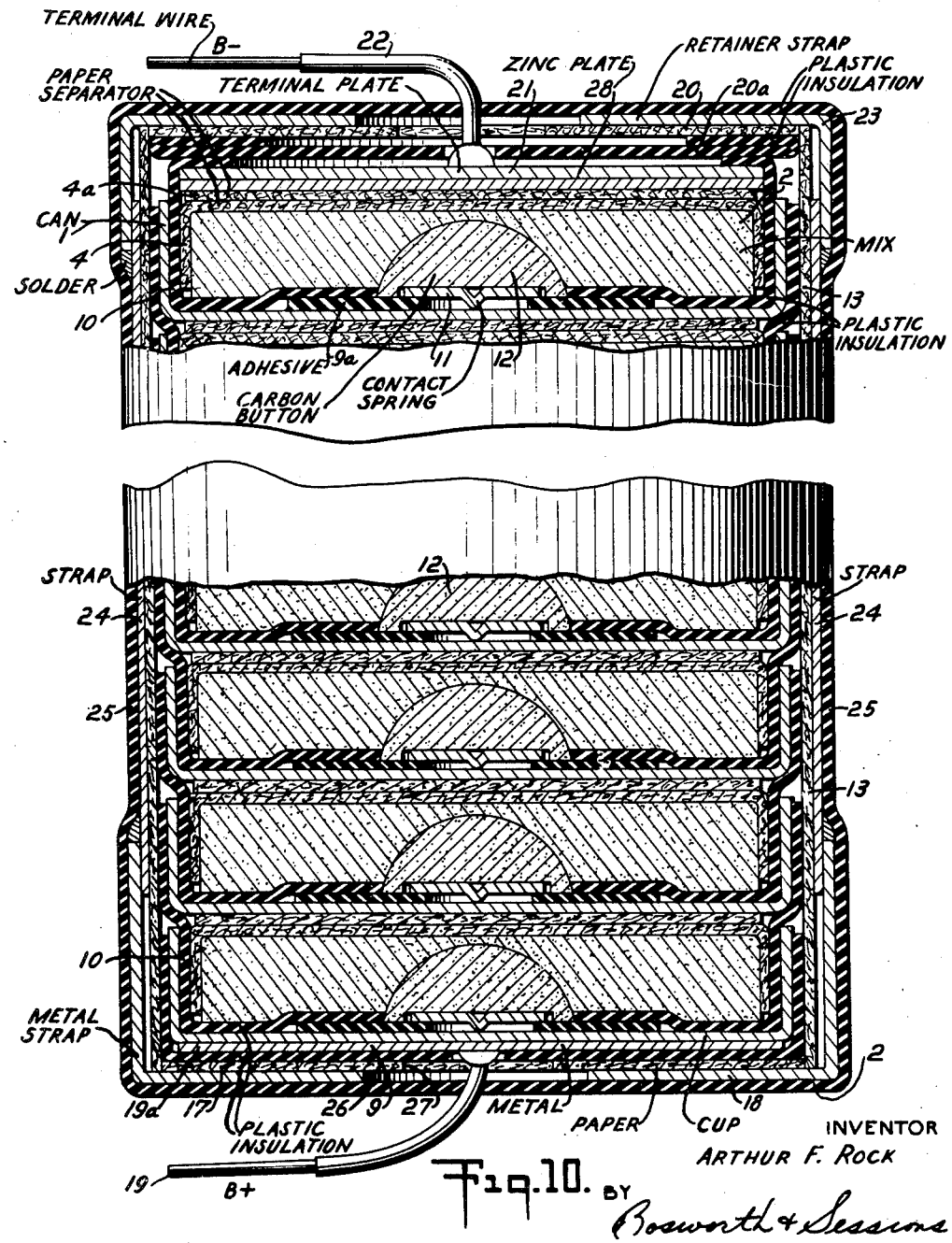
Fig. 10 is an enlarged cross-sectional view of the completed battery.

A plurality of cells formed as hereinbefore described may be assembled to constitute a battery in the manner illustrated in Fig. 6 which discloses a fixture for inserting a plurality of such cells into an outer container 13 which is preferably formed of paper and which is positioned in the centrally disposed recess provided in the block 14. The reference character 15 designates a plunger which is operated in any suitable manner to project or thrust one cell after another into the outer paper container. Disposed below the plunger 15 is a follow-up plunger 16 which engages the bottom of the lowermost cell and is moved with plunger 15 in a step-by-step motion so that any number of cells may be placed within the outer container. If desired, an additional layer of battery paper 4a may be interposed between the bottom of each zinc cup and the preceding paper-covered mix cake, or the layer 4a may be placed in position during a previous operation. When the outer container has been filled with the desired number of cells, a layer of paper 17 (see Fig. 10) and a strip of terneplate 18 are placed over the bottom of the cell and a terminal wire 19 is soldered to the metal plate 19a which engages the outside of the bottom of the lowermost zinc can. The strip 18 and the battery paper have openings 26 and 27, respectively, for the terminal wire 19. The topmost cell, the active zinc surface of which is constituted by the zinc plate 28, is also covered with two or more layers of paper 20 and insulation 20a and a zinc plate 21 to which the upper terminal wire 22 is soldered. This construction is illustrated and described in detail in my copending application aforesaid. The entire unit is then placed in a suitable fixture, and metal retainer straps 23 and 24 are secured thereabout so as to hold the cells in intimate electrical contact (Figs. 7 and 8). The entire unit is then coated with or dipped in a layer 25 of plastic insulating material which sets but remains somewhat stretchable. The completed battery is illustrated in Figs. 9 and 10.

It will now be clear that I have provided a method of constructing a dry cell battery unit which will accomplish the objects of the invention as hereinbefore set forth. It is intended that the several steps are to be performed by an automatic or semi-automatic machine which forms no part of this invention.

Having thus described this invention, I claim:

1. The method of constructing a dry cell battery unit which includes the steps of preforming a mix cake of a desired shape, covering the sides and one face thereof with battery paper, positioning a thin layer of sheet plastic insulating material over a zinc cup which is of the same shape as the mix cake, positioning the mix cake over the layer of sheet plastic insulating material with the covered face thereof up, then thrusting the mix cake downwardly into the zinc cup thereby to cause the layer of sheet plastic insulating material to be folded upwardly along the sides of the mix cake between the battery paper and the inner side walls of the zinc cup.

2. The method according to claim 1 wherein a plurality of assemblies produced as set forth in claim 1 are stacked together with the exterior bottom surfaces of the zinc cups in the stack in contact with the battery paper of the assembly immediately beneath.

3. The method of constructing a dry cell battery unit which includes the steps of preforming a mix cake of a desired shape, covering one face thereof with battery paper, positioning a thin layer of sheet plastic insulating material over a zinc cup which is of the same shape as the mix cake, positioning the mix cake over said layer of sheet plastic insulating material with the covered face thereof up, then thrusting the mix cake downwardly into the zinc cup thereby to cause the layer of sheet plastic insulating material to be folded upwardly along the sides of the mix cake within the zinc cup.

4. The method of constructing a dry cell battery unit which includes the steps of preforming a mix cake of a desired shape, covering one face thereof with battery paper, positioning a thin layer of sheet plastic insulating material over a zinc cup which is of the same shape as the mix cake, said layer having an aperture therein, positioning a carbon electrode in said zinc cup in alignment with the aperture in said layer, positioning the mix cake over said layer of sheet plastic insulating material with the covered face thereof up, then thrusting the mix cake downwardly into the zinc cup thereby to cause the layer of sheet plastic insulating material to be folded upwardly along the sides of the mix cake within the zinc cup and to cause the carbon electrode to engage the mix cake.

5. The method according to claim 4 wherein the carbon electrode is adhesively secured to the inner bottom surface of the zinc cup.

6. The method of constructing a dry cell battery unit which includes the steps of preforming a mix cake of a desired shape, covering one face thereof with battery paper, indenting a recess in the face of the mix cake opposite the covered face thereof, positioning a thin layer of sheet plastic insulating material over a zinc cup which is of the same shape as the mix cake, said layer having an aperture therein, positioning a carbon electrode in said zinc cup in alignment with the aperture in said layer, positioning the mix cake over said layer of sheet plastic insulating material with the covered face thereof up and with the recess in alignment with said carbon electrode, then thrusting the mix cake downwardly into the zinc cup thereby to cause the layer of sheet plastic insulating material to be folded upwardly along the sides of the mix cake within the zinc cup and to cause the carbon electrode to be positioned within the recess in the mix cake.

7. The method according to claim 6 wherein a plurality of assemblies produced as set forth in claim 6 are stacked together within a casing with the exterior bottom surfaces of the zinc cups in the stack in contact with the battery paper of the assembly immediately beneath and with the plastic insulating material associated with each assembly extending around the exterior side surfaces of the zinc cup of the assembly above.

ARTHUR F. ROCK.

REFERENCES CITED

The following references are of record in the file of this patent:

UNITED STATES PATENTS

| Number | Name | Date |
| --- | --- | --- |
| 2,287,114 | McEachron | June 23, 1942 |
| 2,307,762 | Deibel | Jan. 12, 1943 |
| 2,307,764 | Deibel et al. | Jan. 12, 1943 |